(12) United States Patent
Belous

(10) Patent No.: US 6,183,239 B1
(45) Date of Patent: Feb. 6, 2001

(54) INJECTION MOLDING MACHINE VALVE GATE NOZZLE

(75) Inventor: Eduardo L. Belous, Roselle, IL (US)

(73) Assignee: Fast Heat, Inc., Elmhurst, IL (US)

( * ) Notice: Under 35 U.S.C. 154(b), the term of this patent shall be extended for 0 days.

(21) Appl. No.: 09/233,536

(22) Filed: Jan. 20, 1999

(51) Int. Cl.⁷ .................................................. B29C 45/23
(52) U.S. Cl. ............................................ 425/564; 425/566
(58) Field of Search .................................... 425/562, 563, 425/564, 565, 566

(56) References Cited

U.S. PATENT DOCUMENTS

| | | |
|---|---|---|
| 4,161,386 | 7/1979 | Osuna-Diaz . |
| 4,196,855 | 4/1980 | Osuna-Diaz . |
| 4,266,723 | 5/1981 | Osuna-Diaz . |
| 4,279,582 | 7/1981 | Osuna-Diaz . |
| 4,330,258 * | 5/1982 | Gellert .................................. 425/564 |
| 4,434,053 | 2/1984 | Osuna-Diaz . |
| 4,492,556 | 1/1985 | Crandell . |
| 4,652,230 | 3/1987 | Osuna-Diaz . |
| 4,787,836 | 11/1988 | Osuna-Diaz et al. . |
| 4,902,219 | 2/1990 | Leverenz . |
| 5,067,893 * | 11/1991 | Osuna-Diaz .......................... 425/564 |
| 5,078,589 | 1/1992 | Osuna-Diaz . |
| 5,085,572 | 2/1992 | Leverenz . |
| 5,141,696 | 8/1992 | Osuna-Diaz . |
| 5,645,874 | 7/1997 | Osuna-Diaz . |
| 5,670,190 | 9/1997 | Osuna-Diaz . |

* cited by examiner

Primary Examiner—Tim Heitbrink
(74) Attorney, Agent, or Firm—Leydig, Voit & Mayer, Ltd.

(57) ABSTRACT

An injection molding machine valve gate nozzle having a rack driven valve pin actuator for moving the valve pin between open and closed positions during each holding cycle of operation. The valve pin actuator is sealed from the fluid flow stream and the nozzle body has a valve pin guide which substantially separates the melt stream from the valve pin during passage through the nozzle for enhanced long-term operation. The actuator has a modular construction which lends itself to economical manufacture and efficient use in multiple drop or single drop molding machines without modification.

51 Claims, 4 Drawing Sheets

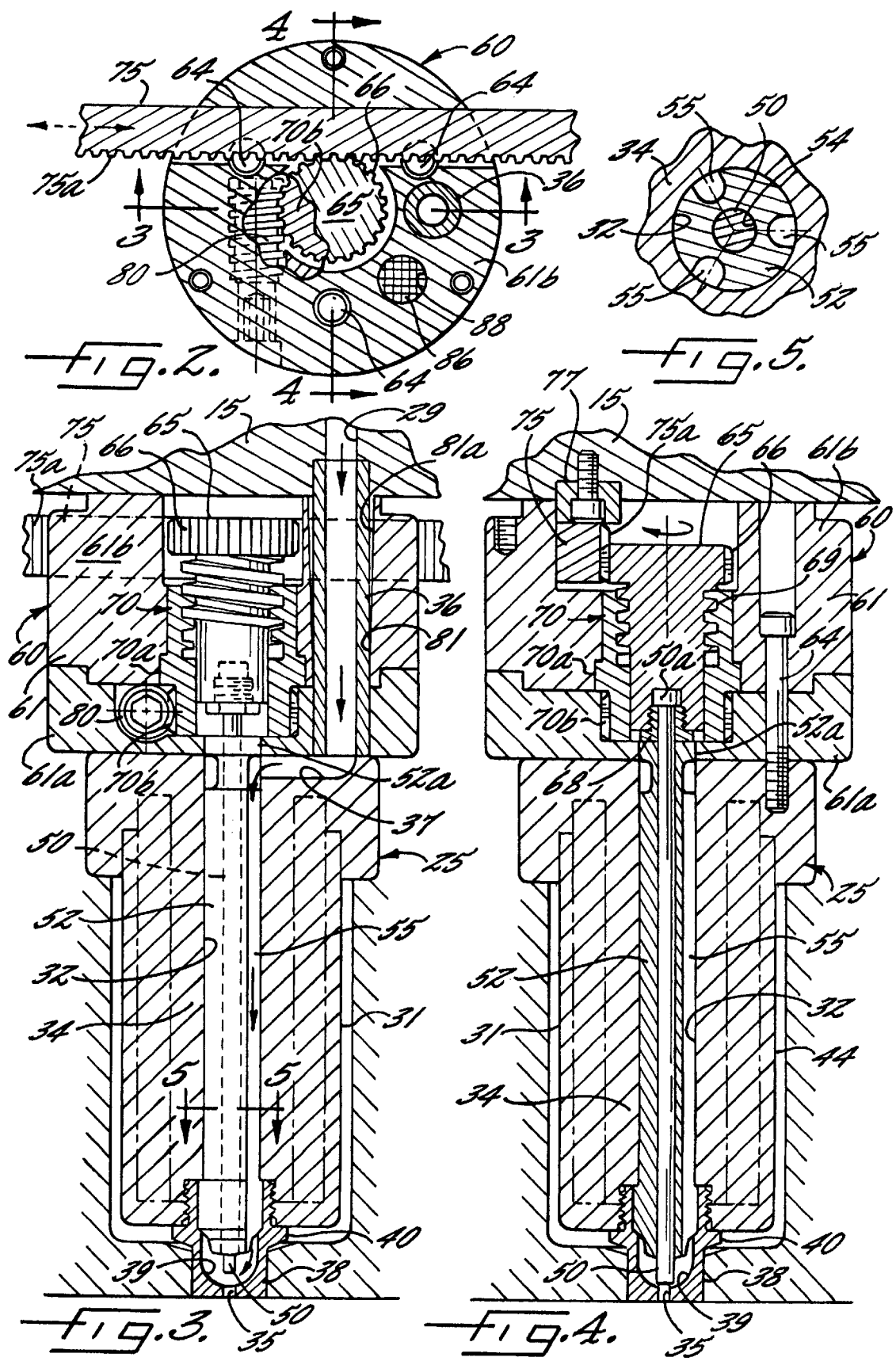

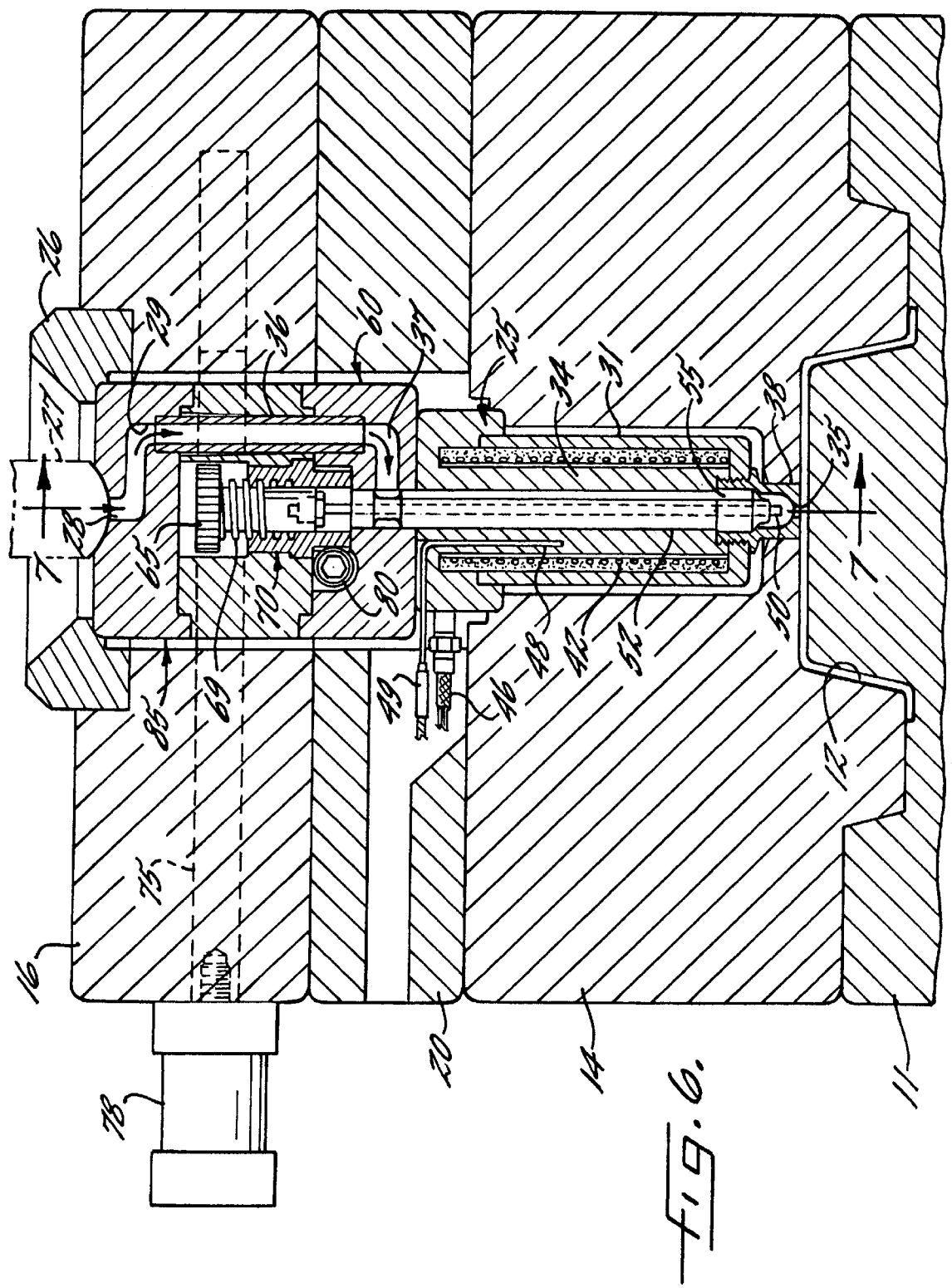

INJECTION MOLDING MACHINE VALVE GATE NOZZLE

FIELD OF THE INVENTION

The present invention relates generally to an injection molding apparatus, and more particularly, to an injection molding machine valve gate nozzle having a reciprocal valve pin cyclically movable between valve gate opening and closed positions for controlling the flow of fluid material to a mold cavity.

BACKGROUND OF THE INVENTION

Nozzles commonly are employed in plastic injection molding machines for heating and directing the flow stream, such as molten plastic, through a gate into a mold cavity while maintaining the flow stream at the proper elevated temperature. Nozzles, sometimes referred to as valve gate nozzles, are known which each include a valve pin movable by an actuator for opening and closing the valve gate at the nozzle tip during each cycle of the molding operation Such valve gate nozzles may be employed in single cavity molds, or alternatively, a series of nozzles may be used in multiple cavity molds. The valve pin actuating means for such valve gate nozzles heretofore have been relatively complicated in design and problem prone in operation. They also often are mechanically inefficient and do not permit precision control of valve pin movement.

Since the plastic injection mold apparatus typically is operated at temperatures in the range of 500–700° F., the valve pin actuator cannot contain lubricant, which may leak and contaminate the flow stream. As a result, relative movement of the actuator parts causes wear and erosion over time, which can effect the shut-off position of the valve pin. Periodically it is necessary to recalibrate the position of the valve pin and/or replace the valve pin and actuator, which may require substantial disassembly of the mold apparatus.

Existing valve gate nozzles, furthermore, channel the flow of the melt stream along the valve pin, which can create a build up about the valve pin and impede reliable operating movement. Because of the high operating temperatures, the nozzles and the mold plates incur temperature expansion and contraction, which also can result in undesirable leakage and contamination about the nozzle. In the event of malfunction or leakage, the manifold must be, disassembled, which can cause costly interruptions in mold operation. Repairs to the valve gate nozzles and their actuators also can be time consuming and expensive.

OBJECTS AND SUMMARY OF THE INVENTION

It is an object of the present invention to provide a plastic injection molding apparatus having valve gate nozzles adapted for more efficient and reliable operation.

Another object is to provide a valve gate nozzle as characterized above which has an actuating mechanism that is mechanically efficient and enables precision control of valve pin movement.

A further object is to provide a valve gate nozzle of the foregoing type that is less susceptible to leakage and wear. A related object is to provide a valve gate nozzle that defines a sealed unit adapted to compensate for heat expansion and contraction without leakage.

Still another object is to provide such a valve gate nozzle in which the valve pin can be easily and accurately calibrated to accommodate for wear from a location external to the mold apparatus.

Yet a further object is to provide a valve gate nozzle that is designed for substantially zero maintenance.

Another object is to provide a valve gate nozzle of the above kind which permits easy replacement of the valve pin and/or valve pin actuator without substantial disassembly of the molding machine.

Still another object is to provide a valve gate nozzle in which the movable valve pin is less susceptible to undesirable build up or contamination from the flow stream. A related object is to provide such a valve gate nozzle in which the valve pin is substantially separated from the fluid flow stream.

Another object is to provide a valve gate nozzle of the above type which has a standardized design that permits its usage in single or multiple cavity molding machines without alteration.

Other objects and advantages of the invention will become apparent upon reading the following detailed description and upon reference to the drawings, in which:

BRIEF DESCRIPTION OF THE DRAWINGS

FIG. 2 is an enlarged fragmentary section of a valve pin actuator for one of the nozzles, taken in the plane of line 2—2 in FIG. 1;

FIGS. 3 and 4 are enlarged vertical sections of the valve gate nozzle, taken in the plane of lines 3—3 and 4—4 in FIG. 2, respectively;

FIG. 5 is an enlarged fragmentary section of the valve pin guide of the nozzle illustrated, taken in the plane of line 5—5 in FIG. 3;

FIG. 6 is a vertical section of a single cavity mold having a single drop valve gate nozzle and actuator in accordance with the present invention;

Figure 1:
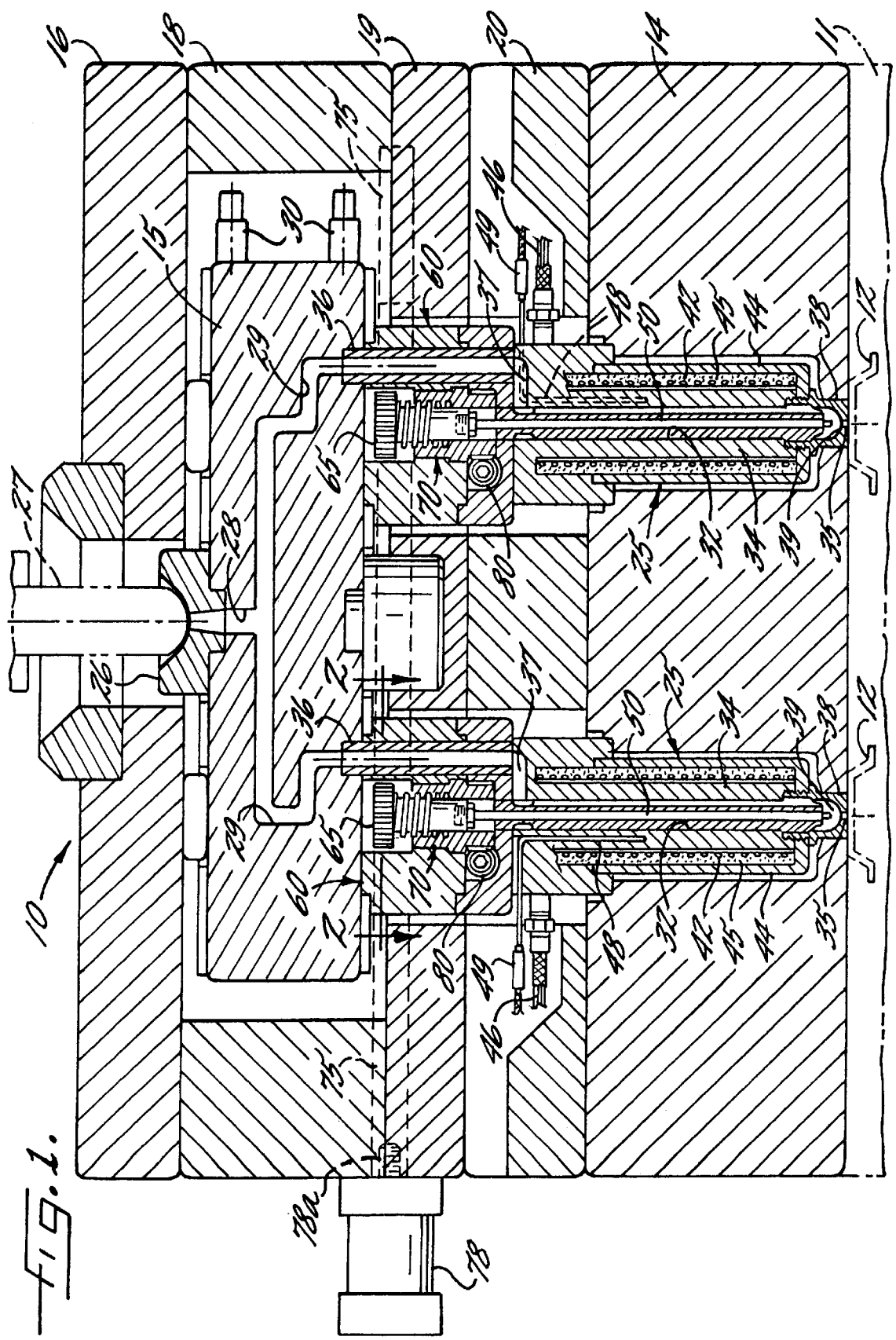
FIG. 1 is a vertical section of a multiple cavity injection molding apparatus having a plurality of valve gate nozzles in accordance with the present invention.

While the invention is susceptible of various modifications and alternative constructions, certain illustrated embodiments thereof has been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENT

Referring more particularly to FIG. 1 of the drawings, there is shown an illustrative multiple-cavity injection molding machine 10 comprising a conventional mold cavity plate 11 defining a plurality of mold cavities 12, a gate plate 14, disposed immediately above the mold cavity plate 11, a manifold plate 15, an uppermost retainer plate 16, and spacer plates 18, 19, 20. A plurality of valve gate nozzles 25, corresponding to a number of the mold cavities 12, are mounted in the gate and spacer plates 14, 20. The manifold plate 15 has a single entry bushing 26 which receives a machine nozzle 27 for directing a melt stream, such as a fluid plastic material from a supply source, into a central passage 28 that communicates material to branch passages 29 each leading to a respective one of the valve gate nozzles 25, which heat the respective flow streams and sequentially control the flow thereof to the mold cavities 12. For heating the manifold 15 and the liquid flow stream directed through the passageways 28, 29, the manifold 15 has a plurality of electric manifold heaters 30. It will be appreciated that since the valve gate nozzles 25 are identical in construction only one need be described herein in detail.

Each valve gate nozzle 25 comprises a cylindrical body 31 having an axial bore 32. The axial bore 32 extends longitudinally through a central cylindrical core 34 of the nozzle body 31 for enabling direction of the fluid flow stream to a valve gate 35. A feed tube 36 in this case communicates between each manifold passage 29 and a fluid passage 37 formed in an upstream end of the nozzle body 31. The gate 35 of the mold apparatus in this instance is defined by a generally cylindrical gate insert 38 threaded into a downstream end of the cylindrical core 34. The gate insert 38 has an internal spherical dome chamber 39 leading to the gate 35, which in turn communicates with the mold cavity 12 (FIG. 3). The gate insert 38 has an outwardly extending flange 40 intermediate its ends for engaging a downstream end of the core 34 for establishing the predetermined axial position of the gate 35 with respect to the nozzle body 31. The illustrated gate insert 3 8 has a flat downstream end co-planar with the bottom of the gate plate 11.

For heating the melt stream during its travel through the axial nozzle 25, the nozzle body 31 includes an electrical resistance heating element 42 helically wound around the cylindrical core 34, which preferably is made of ceramic. The core 34 and electrical heating element 42 are disposed within a cylindrical bore of an outer shell 44, preferably made of metal, with an electrically insulative powder 45, such as magnesium oxide, interposed between the core 34 and metallic shell 44 in surrounding relation about the heating element 42. To compress the powder 45 and fill all voids around the heating element 42 for efficient thermal conductivity and for securing the shell 44, heating element 42, powder 45, and core 34 in an integral unit, the shell 44 preferably is swedged by rolling or the like to compress and reduce its diameter.

For connecting the electrical resistance heating element 40 to an electrical power source, the heating element 42 has leads 46 extending radially through an upper end of the shell 44 and into a passage between the spacer plate 19, 20. In order to sense the temperature of the core 34, a thermocouple 48 extends between the core 34 and shell 44 to a point approximately midway the axial length of the nozzle 25 and has an upstream lead 49 extending from the nozzle shell 44 at a location adjacent the heating element leads 46.

To control the entry of the flow stream from the nozzle 25 to the mold cavity 12, the nozzle 25 includes a valve pin 50 disposed axially within the nozzle for reciprocating movement between a lowered valve gate closing position and a raised valve gate opening position. The downstream end of the valve pin 50 is sized such that when the valve pin is in its lowered closing position, the valve pin seats within the valve gate 35 to terminate the direction of the flow stream into the mold 12, and in the raised position, the fluid flow stream passes about the end of the valve pin 50, through the valve gate 35, and into the mold cavity 12. It will be understood by one skilled in the art that the valve pin 50 is reciprocated between open and closing positions during each operating cycle of the molding machine.

In accordance with one aspect of the invention, the valve pin is supported for axial reciprocating movement in a valve pin guide which maintains the valve pin in precise axial relation to the valve gate and which substantially separates and protects the valve pin from contaminants and build ups that can adversely affect its reliable operation. To this end, in the illustrated embodiment, a valve pin guide 52 in the form of an elongated member extending the length of the nozzle body 31 is disposed within the central bore 32 thereof. The valve guide 52 has a central bore 54 which supports and guides axial movement of the valve pin 50 and a plurality of circumferential grooves 55, in this case generally U-shaped, which together with the bore 32 define a plurality of flow passageways about the outer periphery of the valve guide 52 (FIG. 5). As seen in FIG. 3, the downstream end of the valve guide is mounted within a cylindrical counterbore of the valve gate insert 32 with the terminal end of the valve guide 52 disposed within the dome chamber 39. Hence, the flow passageways defined by the circumferential grooves 55 of the valve guide 52 each communicate with the dome chamber 39 about the protruding end of the valve pin 50. Hence, it can be seen that the valve guide 52 not only supports and guides movement of the valve pin 50, but substantially separates the pin 50 from the fluid flow stream, except for the terminal end.

In accordance with an important aspect of the invention, the valve gate nozzles have an improved valve pin actuating system that is mechanically efficient, precisely controllable, and adapted for more reliable operation. More particularly, each nozzle has a respective rack driven actuator mounted on the upper end of the nozzle body and operated from an external location. The illustrated valve gate nozzles 25 each includes an actuator 60 having a two-part cylindrical housing 61 comprising a base 61a and a cylindrical side wall portion 61b which are fixed to each other and to an upstream end of the nozzle body 31 by bolts 64. The actuator 60 includes a rotary pinion 65 fixed to an upper end of the valve pin 50 formed with rack-receiving straight teeth 66, oriented parallel to the axis of the nozzle and valve pin movement. The valve pin 50 in this instance has an upper head 50a fixed within a screw 68 threadably engaged within a central bore in the bottom of the pinion 65 and the valve guide 52 has an upper end 52a fixed within a bore of the actuator housing base 61 immediately below the screw 68. By virtue of such arrangement, it will be seen that the valve pin 50 is supported for axial movement with respect to the valve guide 52, nozzle body 31 and actuator housing 61.

For axially advancing and retracting the valve pin 50, the pinion 65 from which the valve pin 50 extends is formed with external helical threads 69 along an intermediate or second section thereof which is supported for relative movement within an internally-threaded, longitudinally-retained rotatable nut 70. The nut 70 is longitudinally held within the actuator housing 61 by virtue of a radial flange 70a intermediate its ends disposed within an annular groove defined by the actuator housing base 61a and side wall portion 61b.

In keeping with the invention, the valve pin actuation system includes a laterally movable rack 75 that is engageable with the rotary pinion 65 for moving the valve pin 50 between open and closed positions. The rack 75 in this case extends horizontally across the mold apparatus 10 and through the actuator housings 61 of each of the plurality of valve gate nozzles 25. In the illustrated embodiment, a rack guide plate 77 is bolted to the underside of the manifold plate immediately above the rack 75. The rack 75 is formed with vertical teeth 75a operable for engaging the vertical teeth 66 of the rotary pinions 65 of the actuators 60 for each of the nozzles 25 for rotating the pinions 65 supported thereby as in incident to lateral rack movement. It will be seen that lateral movement of the rack 75 in one direction will rotate the pinion 65 relative to the longitudinal retained nut 70, advancing the pinion 65 and valve pin 50 supported thereby in a downward valve closing position and lateral movement of the rack 75 in an opposite direction, will rotate the pinion 65 so as to advance the pinion 65 and the valve pin 50 in an upward valve gate opening direction.

For laterally moving the rack 75, a drive is supported exteriorly of the mold apparatus 10. The drive, which may be a double acting pneumatic or hydraulic cylinder 78, in this case has a cylinder rod 78*a* fixed at one end to the rack 75, such that upon actuation of the cylinder 78 in a direction that extends the cylinder rod 78*a*, the rack 75 is moved to the right, as viewed in FIG. 1, and actuation of the cylinder 78 in an opposite cylinder rod retracting direction, will move the rack 75 in an opposite direction. It will be understood by one skilled in the art that alternatively an electric stepping motor could be used as the drive for moving the rack 75. It will be appreciated that since the cylinder 78 is supported exteriorly of the mold apparatus 10, it is easily accessible for repair and replacement, and in the event that a hydraulic cylinder is used, hydraulic lines and the fluid reservoir may communicate with the cylinder exteriorly of the nozzles as a safeguard against contamination internally of the apparatus in the event of leakage.

It will further be appreciated by one skilled in the art that the rack and pinion drive of the valve pin actuating system is mechanically efficient and adapted for precise control. For example, the rack 75 may be designed with a relatively high ratio for rack movement versus axial pinion movement (hereinafter referred to as the "rack-to-pinion movement ratio"). With a 3 to 1 rack-to-pinion movement ratio, for example, the rack must laterally advance three increments in order to move the valve pin one increment. It will be understood by one skilled in the art that the desired rack-to-pinion movement ratio can be achieved by appropriate design of the pinion diameter, helical threads 69 and teeth 66. Preferably the actuating system should have a rack-to-pinion movement ratio of at least 2, and most preferably, about 3. As a result of such mechanical efficiency, a single drive cylinder may be utilized to simultaneously drive the valve pins 50 for a plurality of valve gate nozzles 25. Such relatively high rack and pinion movement ratio further enables relatively precise control in movement and positioning of the valve pins 50 during each operating cycle. While the common rack 75 drives the actuators 60 for a plurality of valve gate nozzles 25 in the manifold mounted apparatus, as depicted in FIG. 1, it will be appreciated that by appropriate selection of pinions 65 and nuts 70, actuation of the individual nozzles 25 can be controlled for the particular molding operation. Hence, the mold apparatus 10 may be designed for molding a family of parts, which need not be of identical form.

In keeping with the invention, the valve pins 50 of the valve gate nozzles 25 are rotated as they are moved axially in a valve gate closing direction. Since the valve pins 50 are fixed in depending relation to the pinions 65, it will be seen that as the rack 75 is laterally advanced to rotate the pinion 65 in a valve closing direction, the valve pin 50 is simultaneously rotated. Such rotational pin movement is believed to enable the valve pins 50 to advance through the material of the melt streams being directed into the valve gates 35 with reduced axial force. Hence, such rotary axial movement enhances reliable cyclic operation of the valve gate nozzles 25 during molding and also minimizes the design criteria for the racks 75, pinions 65, and drive cylinder 78.

Since the injection molding apparatus 10 typically is operated at relatively high temperatures, such as in the range of 500–700 degrees F. without lubricant, over time wear to the actuator parts can require periodic re-calibration of the stroke of the valve pins 50 in order to ensure reliable shut off and proper timed movement between opening and closing positions. As indicated above, heretofore such re-calibration of the valve pin setting has been cumbersome and often has necessitated substantial interruption in operation of the molding apparatus.

In accordance with a further aspect of the invention, the valve pins 50 can be easily and precisely re-calibrated to compensate for wear from a location external to the mold apparatus and without disassembly or substantial interruption of its operation. For this purpose, each actuator nut 70 is formed with an external threads 70*b* engageable by a respective worm gear 80 that extends through the actuator housing 60 to a location accessible for turning from an external location. It will be seen that each worm gear 80 in this case is disposed in a plane perpendicular to the valve pin 50 and rack 75, such that rotation of the worm gear 80 will rotate the longitudinally retained nut 70, in turn causing relative axial advancement or retraction of the pinion 65 and valve pin 50 relative to the nut 70 depending upon the direction of worm gear rotation. It will be seen that by virtue of the vertically oriented teeth 75*a*, 66 of the rack 75 and pinion 65, the pinion 65 and valve pin 50 supported thereby may be raised and lowered with respect to the rack 75, enabling the necessary limited calibrating movement.

In keeping with a further aspect of the invention, the valve gate nozzle actuators 60 define units that are effectively sealed from the fluid flow streams. To this end, the feed tube 36 is disposed within a bore 81 of the actuator housing 60, with the lower end of the feed tube 36 press fit in sealed relation with the base 61*a* of the actuator housing 61 and the upper end press fit in sealed relation to the lower end of the manifold plate 15. Hence, the feed tube 36 defines a sealed fluid passageway through the actuator 60 from the manifold passageways 29 to the fluid passageway 37 in the nozzle body 31. The upper ends of the cylindrical side wall portions 61*b* of the actuator housings 61, furthermore, are in tight fitting bearing engagement with an underside of the manifold plate 15 to provide a redundant seal about the pinion 65, nut 70, rack 75, and worm gear 80 of the pin actuating system.

In further keeping with the invention, in order to allow for temperature expansion and contraction of the nozzles 25 and manifold plate 15, which might cause fluid flow stream leakage, the feed tube receiving bore 81 of the actuator housing 61 is upwardly tapered so as to define an upwardly increasing space 81*a* between the feed tube 36 and the bore 81. It can be seen that with the feed tube 36 secured at its lower end to the actuator base 61*a* and at its upper end to the manifold plate 15, the feed tube 36 may bend and move within the tapered bore 81 during temperature expansion and contraction of the manifold plate 15 relative to the nozzle 25 without incurring high stresses or possible breakage or damage.

It will be understood by one skilled in the art that the actuators 25 include most of the moving parts that are exposed to wear during usage and which most likely may require maintenance. Since the actuators 25 basically have a modular construction, they are adapted for easy removal and replacement with minimum down time in operation of the mold apparatus 10. Upon disassembly of the manifold plate 15 and removal of the retaining screws 64, the actuators 60 including their respective valve pins 50, may be easily lifted from the nozzle and replaced with a new unit with minimal effort. Moreover, if desired, upon unscrewing of the pinion 65 from the nut 70 through advancement of the rack 75, the pinion 65 and valve pin 50 may be lifted from the nozzle, enabling replacement of a new valve pin, or alternatively, a valve pin of different size or configuration. Alternatively, by virtue of the straight teeth of the rack 75 and pinion 65, the nozzle 25 and actuator 60 both may be removed from the apparatus, leaving the rack in place.

Since the actuators 60 have a conmmon modular design, it will farther be appreciated that the actuators 60 adapted for efficient and relatively inexpensive manufacture. Hence the actuators 60 can be designed for zero maintenance, disposable usage. In other words, upon routine maintenance shut down of the mold apparatus 10, all of the actuators 60 can simply be removed and replaced with new actuators, with the old actuators being discarded.

Figures 7, 8:
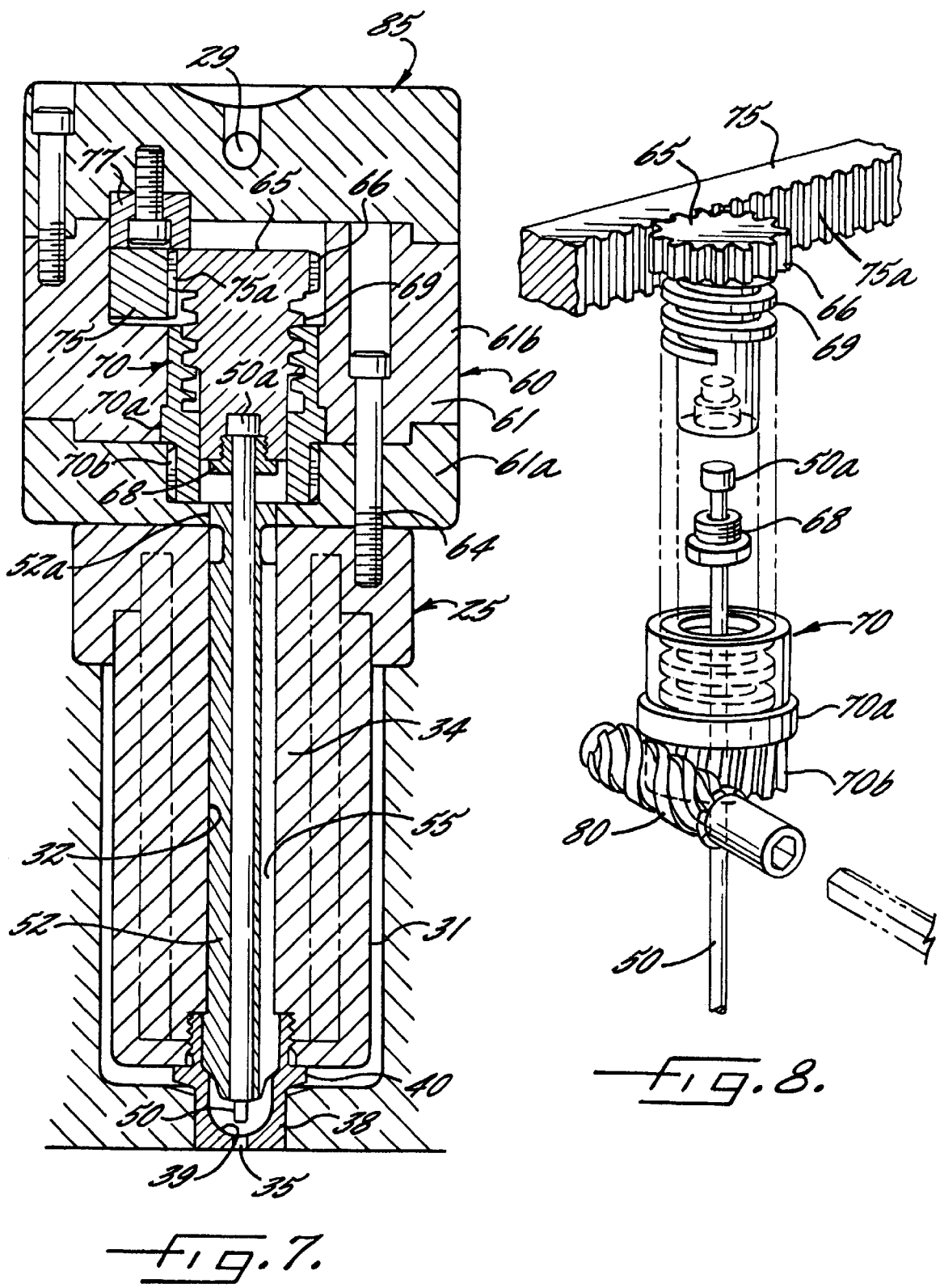
FIG. 7 is an enlarged vertical section of the nozzle shown in FIG. 6, taken in the plane of line 7—7.
FIG. 8 is an exploded perspective of the valve pin actuator for the illustrated nozzles.

The uniform design of the valve gate nozzle 25 and actuators 60, furthermore, enable the nozzles 25 and actuators 60 to be used in manifold injection molding machines, such as shown in FIG. 1, or alternatively, in single drop molding machines, such as depicted in FIGS. 6 and 7. In single drop molding machines, the nozzle 25 simply has an end cap 85, in lieu of a manifold plate 15, enclosing the upper end of the actuator 60. The end cap 85 receives the feed tube 36 of the injection molding machine in the same manner as the manifold plate 15, and the actuator 60 is similarly driven by a rack 75 affixed to the rod of an externally mounted drive cylinder 78. In such single drop valve gate nozzle installations, for maintaining the fluid flow stream at the proper temperature during passage through the feed tube 36, the actuator 60 has a cartridge heater 86 disposed within a cylindrical bore 88 in the actuator side wall portion 61b parallel and in close relation to the feed tube 36.

From the foregoing, it can be seen that the valve gate nozzles of the present invention are adapted for economical manufacture and efficient and reliable operation. The actuating system for the valve gate nozzles is mechanically efficient and enables precise control in valve pin movement and positioning. Since the actuators constitute respective sealed units for each nozzle, which are designed to accommodate temperature expansion and contraction, the actuators and nozzles are less susceptible to leakage and wear. The actuators further allow for easy and accurate recalibration of the valve pin to accommodate for wear. The valve gate nozzles and their actuators, also may have a standardized design which permits usage in either single or multiple cavity molding machines, and by virtue of the commonality of design, efficiencies of manufacture are permitted that enables repair and replacement of the actuators on a zero maintenance basis.

What is claimed is:

1. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion fixed to said valve pin, a rack disposed for lateral movement transverse to said pinion, said rack being engageable with said pinion for rotating said pinion to simultaneously axially advance and retract said pinion and valve pin relative to said rack in response to reciprocating lateral movement of said rack, and a drive for laterally reciprocating said rack during each molding cycle of operation.

2. The injection molding apparatus of claim 1 in which said rack and pinion have straight gear teeth oriented parallel to said valve pin.

3. The injection molding apparatus of claim 2 in which said pinion is operatively disposed within an axially retained nut for threaded advancement and retraction relative to said nut during each molding cycle of operation.

4. The injection molding apparatus of claim 1 in which said rack and pinion are designed to effect a ratio of lateral rack movement versus axial pinion movement of at least 2.

5. The injection molding apparatus of claim 4 in which said rack and pinion are designed to effect a ratio of a lateral rack movement versus axial pinion movement of about 3.

6. The injection molding apparatus of claim 1 in which said valve pin is fixed in depending relation to said pinion.

7. The injection molding apparatus of claim 1 including an adjustable calibrating member for selectively adjusting the axial position of said pinion and valve pin relative to said rack and valve gate.

8. The injection molding apparatus of claim 1 in which said drive is a fluid operated cylinder having a cylinder rod fixed to said rack.

9. The injection molding apparatus of claim 8 in which said cylinder is mounted at an exterior location on said apparatus.

10. The injection molding apparatus of claim 1 in which said actuator has a cylindrical housing mounted on an upper end of said nozzle, and said pinion being axially disposed within said housing.

11. The injection molding apparatus of claim 10 in which said nozzle body defines a melt stream flow passage communicating with said gate, and a flow tube extending through said actuator housing for communicating a melt stream to said nozzle passage.

12. The injection molding apparatus of claim 11 in which said actuator housing is formed with a bore extending axially through said housing, and said flow tube being mounted in sealed relation with respect to said bore.

13. The injection molding apparatus of claim 10 in which said actuator housing includes a base plate and a cylindrical side wall portion, said cylindrical side wall portion and base plate being fixed to each other and to said nozzle by common bolts.

14. The injection molding apparatus of claim 1 in which said valve pin is releasably secured to said pinion in depending relation thereto.

15. The injection molding apparatus of claim 14 in which said valve pin is secured to said pinion by a retaining nut threadably engaging an underside of said pinion.

16. An injection molding apparatus comprising a manifold plate, a cavity plate defining a plurality of mold cavities, each mold cavity having a respective valve gate nozzle for heating and controlling the flow of a melt stream through said valve gate to a respective cavity, each said nozzle having a nozzle body, a valve pin axially movable within the body of each nozzle between valve gate closing and opening positions, said nozzles each having an actuator for moving the respective valve pin between said opening and closing positions, said actuators each including a pinion fixed to a respective valve pin, a single rack engaging the pinion of each actuator and being disposed for lateral movement transverse to said pinions for simultaneously rotating said pinions to axially advance and retract the pinions and valve pins for each of said nozzles relative to said rack in response to reciprocal lateral movement of said rack, and a drive for laterally reciprocating said rack.

17. The injection molding apparatus of claim 16 in which said actuators each have a cylindrical housing mounted on an upper end of a respective nozzle, and said pinion for each actuator being mounted within said actuator housing.

18. The injection molding apparatus of claim 17 in which said rack extends laterally through the actuator housing of each nozzle for engaging the pinion disposed therein.

19. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions, a valve guide disposed within said nozzle body and extending substantially the length thereof, said valve guide having an axial bore within which said valve pin is disposed for relative reciprocating movement, and said valve guide defining at least one passage extending substantially the length thereof for communicating a melt stream substantially the length of said nozzle body while separated from said valve pin and for directing the melt stream to said valve gate and into first contact with said valve pin at a location adjacent the terminal end of said valve pin.

20. The injection molding apparatus of claim 19 in which said valve guide is formed with a plurality of circumferentially spaced flow passages communicating with said valve gate.

21. The injection molding apparatus of claim 20 in which said valve guide is mounted within an axial bore of said valve body, and said valve guide is formed with a plurality of circumferential grooves which together with said nozzle body bore defines said flow passages.

22. The injection molding apparatus of claim 21 in which said nozzle body includes a core, said nozzle body bore being formed within said core, and said gate being defined by a separate gate insert fixed in a downstream end of said core.

23. The injection molding apparatus of claim 22 in which said gate insert is in threaded engagement with a downstream end of said core.

24. The injection molding apparatus of claim 19 in which said gate is defied by a separate gate insert fixed in a downstream end of said nozzle, said gate defining an internal cavity communicating between a discharge end of said flow passage and said valve gate.

25. The injection molding apparatus of claim 19 in which said valve guide is mounted in depending relation to said actuator and extends the length of said nozzle body for maintaining the flow stream separated from the valve pin throughout its travel through the nozzle body.

26. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions, said actuator including a first laterally movable actuator member and a second rotatable actuator member, said valve pin being fixed to said second actuator member for rotation with said second actuator member, said second actuator member and pin being simultaneously rotatable in response to lateral movement of said first actuator member for axially advancing and retracting said valve pin between valve closing and opening positions, a drive for laterally reciprocating said first actuator member, and said first and second actuating members being designed to effect a ratio of lateral first actuator movement versus axial valve pin movement of at least two.

27. The injection molding apparatus of claim 26 in which said actuating members are designed to effect ratio of lateral first actuator movement versus axial valve pin movement of about three.

28. An injection molding apparatus comprising a valve gate nozzle for heating and controlling the flow of a melt stream through a valve gate to a mold cavity, said nozzle having a nozzle body, said valve body defining a flow passage for communicating a melt stream to said valve gate, a valve pin axially movable within said body between valve gate closing and opening positions, an actuator for axially moving said valve pin between said opening and closing positions and simultaneously rotating said valve pin during each molding cycle of operation.

29. The injection molding apparatus of claim 28 in which said actuator includes a first laterally movable actuator member and a second rotatable actuator member, said second rotatable actuator member being coupled to said valve pin, and said second actuator member and valve pin being axially moveable and simultaneously rotatable in response to reciprocating lateral movement of said first actuator member, and a drive for laterally reciprocating said first actuator member.

30. The injection molding apparatus of claim 29 in which said first actuator member is a rack formed with straight teeth parallel to said valve pin, and said second rotatable actuator member is a pinion having straight teeth engageable with the teeth of said rack.

31. An injection molding apparatus comprising a valve gate nozzle for heating and controlling the flow of a melt stream through a valve gate to a mold cavity, said nozzle having a nozzle body, said nozzle body defining a flow passage for communicating a melt stream to said gate, a valve pin axially movable within said body between valve gate closing and opening positions, an actuator for moving said valve pin between said opening and closing positions, said actuator having a housing, a manifold plate enclosing an upper end of said actuator housing and formed with a flow passage, a flow tube extending through said actuator housing with its opposite ends in fixed sealed relation to said manifold plate and said actuator housing respectively for communicating a melt stream between said manifold plate passage and said nozzle body passage while permitting relative temperature induced contraction and expansion between said manifold plate and actuator housing.

32. The injection molding apparatus of claim 31 in which said flow tube is disposed within a bore formed in said actuator housing, and said bore has an upwardly and outwardly tapered form for providing a progressively greater clearance space between said bore and tube in an upward direction.

33. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, an axially retained nut within which said pinion is disposed for threaded advancement and retraction relative to said nut during each molding cycle of operation, a rack disposed for lateral movement transverse to said pinion for rotating said pinion to axially advance and retract said pinion and valve pin relative to said nut in response to reciprocating lateral movement of said rack, a drive for laterally reciprocating said rack during each molding cycle of operation, said pinion having straight externally formed gear teeth oriented parallel to said valve pin on a first section of the pinion for engagement with gear teeth of said rack, and said pinion having a second externally threaded section threadedly engaging said nut.

34. The injection molding apparatus of claim 33 in which said first pinion section is disposed above said second section.

35. The injection molding apparatus of claim 33 in which said first pinion section is disposed above said nut.

36. The injection molding apparatus of claim 33 including an adjustable calibrating member for selectively adjusting the axial position of said pinion and valve pin relative to said rack and valve gate, said calibrating member being a worm gear engageable with an externally threaded section of said nut for rotating said nut relative to said pinion and valve pin.

37. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, a rack disposed for lateral movement transverse to said pinion for rotating said pinion to axially advance and retract said pinion and valve pin in response to reciprocate lateral movement of said rack, a drive for laterally reciprocating said rack during each molding cycle of operation, said actuator having a housing mounted on an upper end of said nozzle within which said pinion is disposed, said nozzle body defining a melt stream flow passage communicating with said gate, a flow tube extending through said actuator housing for communicating a melt stream to said nozzle flow passage, a manifold plate formed with a melt stream passage for communicating a melt stream to said flow tube, and said flow tube having an upstream end secured in sealed relation to said manifold plate and a downstream end secured in sealed relation to said actuator housing.

38. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, a rack disposed for lateral movement transverse to said pinion for rotating said pinion to axially advance and retract said pinion and valve pin in response to reciprocate lateral movement of said rack, a drive for laterally reciprocating said rack during each molding cycle of operation, said actuator having a housing mounted on an upper end of said nozzle within which said piston is disposed, said nozzle body defining a melt stream flow passage communicating with said gate, a flow tube extending through said actuator housing for communicating a melt stream to said nozzle passage, said actuator housing being formed with a bore extending through the housing within which said flow tube is mounted, and said bore having an upwardly and outwardly tapered configuration which defines a progressively larger clearance space about said flow tube in an upward direction for permitting lateral movement of said flow tube within said actuator housing bore as an incident to temperature expansion and contraction of said manifold plate.

39. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, a rack disposed for lateral movement transverse to said pinion for rotating said pinion to axially advance and retract said pinion and valve pin in response to reciprocate lateral movement of said rack, a drive for laterally reciprocating said rack during each molding cycle of operation, said actuator having a cylindrical housing mounted on an upper end of said nozzle within which said piston is axially disposed, a removable end cap enclosing an upper end of said housing, said nozzle body defining a melt stream flow passage communicating with said gate, a flow tube extending through said actuator housing for communicating a melt stream to said nozzle flow passage, and said housing end cap having a flow passage for communicating a melt stream to said flow tube.

40. The injection molding apparatus of claim 39 in which said housing has a second axial bore, and a heating element disposed within said second axial bore for heating said melt stream during passage through said flow tube.

41. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, said actuator including a housing within which said pinion is disposed, a nut within which said pinion is mounted for threaded advancement and retraction relative to said nut during each molding cycle of operation, said nut having an outwardly extending flange, said actuator housing having an internal annular channel for receiving said flange and longitudinally retaining said nut while permitting relative rotational movement, a rack disposed for lateral movement transverse to said pinion for rotating said pinion to axially advance and retract said pinion and valve pin relative to said unit in response to reciprocate lateral movement of said rack, and a drive for laterally reciprocating said rack during each molding cycle of operation.

42. The injection molding apparatus of claim 4 in which said actuator includes a base plate and a cylindrical side wall portion, and said cylindrical side wall portion and base plate together define said flange receiving channel.

43. An injection molding apparatus comprising a manifold plate, a cavity plate defining a plurality of mold cavities, each mold cavity having a respective valve gate nozzle for heating and controlling the flow of a melt stream through said valve gate to a respective cavity, each said nozzle having a nozzle body, a valve pin axially movable within the body of each nozzle between valve gate closing and opening positions, said nozzles each having an actuator for moving the respective valve pin between said opening and closing positions, said actuators each having a housing supported under the manifold plate with the manifold plate enclosing an upper end of the housing, said actuators each including a pinion on each valve pin, a rack disposed for lateral movement transverse to said pinions for simultaneously rotating said pinions to axially advance and retract the pinions and valve pins for each of said nozzles in response to reciprocal lateral movement of said rack, and a drive for laterally reciprocating said rack.

44. An injection molding apparatus comprising a manifold plate, a cavity plate defining a plurality of mold cavities, each mold cavity having a respective valve gate nozzle for heating and controlling the flow of a melt stream through said valve gate to a respective cavity, each said nozzle having a nozzle body, a valve pin axially movable within the body of each nozzle between valve gate closing and opening positions, said nozzles each having an actuator for moving the respective valve pin between said opening and closing positions, said actuators each including a pinion on each valve pin, a rack disposed for lateral movement transverse to said pinions for simultaneously rotating said pinions to axially advance and retract the pinions and valve pins for each of said nozzles in response to reciprocal lateral movement of said rack, a drive for laterally reciprocating said rack, said nozzles each defining a melt stream flow passage communicating with a respective gate, a flow tube extending through the actuator of each nozzle for communicating a melt stream to the nozzle flow passage, and said manifold plate being formed with flow passages communicating a melt stream to the flow tubes of each nozzle actuator.

45. An single drop injection molding apparatus comprising a valve gate nozzle for heating and controlling the flow of a melt stream through a valve gate to a mold cavity, said nozzle having a nozzle body that defines a passage for communicating a melt stream through said nozzle to said gate, a valve pin axially movable within said body between valve gate closing and opening positions, an actuator for moving said valve pin between said opening and closing positions, said actuator including a housing mounted on an upper end of said nozzle and a pinion within said housing, said valve pin being mounted in depending relation to said pinion, said valve pin actuator having an end cap enclosing an upper end of said actuator and being formed with a passage for enabling communication of a melt stream to said nozzle body passage, said end cap passage having an inlet configured to receive an injection supply nozzle operable for directing a melt stream from a source to said end cap passage, a rack disposed for lateral movement for rotating said pinion to axially advance and retract said pinion and valve pin in response to reciprocating lateral movement of said rack, and a drive for laterally reciprocating said rack.

46. The injection molding apparatus of claim 45 in which said end cap encloses an upper end of said actuator.

47. The injection molding apparatus of claim 46 including a flow tube extending through said actuator housing for communicating a melt stream between said end cap passage and said nozzle body passage.

48. An single drop injection molding apparatus comprising a valve gate nozzle for heating and controlling the flow of a melt stream through a valve gate to a mold cavity, said nozzle having a nozzle body that defines a passage for communicating a melt stream through said nozzle to said gate, a valve pin axially movable within said body between valve gate closing and opening positions, an actuator for moving said valve pin between said opening and closing positions, said actuator including a housing mounted on an upper end of said nozzle and a pinion within said housing, said valve pin being mounted in depending relation to said pinion, said valve pin actuator having an end cap enclosing an upper end of said actuator and being formed with a passage for enabling communication of a melt stream to said nozzle body passage, a flow tube extending through said actuator housing for communicating a melt stream between said end cap passage and said nozzle body passage, said flow tube being disposed within an upwardly tapered bore of said actuator housing which permits relative movement of the flow tube as an incident to temperature contraction and expansion of said actuator, end cap and nozzle body, a rack disposed for lateral movement for rotating said pinion to axially advance and retract said pinion and valve pin in response to reciprocating lateral movement of said rack, and a drive for laterally reciprocating said rack.

49. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion fixed to said valve pin, a rack disposed for lateral movement transverse to said pinion for simultaneously rotating said pinion and the pin fixed thereto to axially advance and retract said pinion and valve pin relative to said rack in response to reciprocating lateral movement of said rack, and a drive for laterally reciprocating said rack during each molding cycle of operation.

50. An injection molding apparatus comprising a valve gate nozzle for heating and controlling the flow of a melt stream through a valve gate to a mold cavity, said nozzle having a nozzle body, a valve pin axially movable within said body between valve gate closing and opening positions, an actuator for moving said valve pin between said opening and closing positions during each molding cycle of operation, said actuator including a pinion on said valve pin, an elongated selectively movable actuating member extending laterally from said pinion for rotating said pinion to axially advance and retract said pinion and valve pin in response to actuating movement of said member, a drive for moving said actuating member during each molding cycle of operation, and said pinion having a first externally disposed operative section cooperating with said actuating member for imparting rotational movement to said pinion in response to movement of said actuating member and a second externally disposed operative section cooperating with an axially fixed element of said actuator for axially advancing and retracting said pinion and valve pin in response to rotational movement of said pinion.

51. The injection molding apparatus of claim 50 in which said first operative section comprises rack engageable teeth and said second operative section comprises threads.

* * * * *